April 26, 1949.    R. H. KUTZNER    2,468,451
ROTARY INTERNAL-COMBUSTION ENGINE
Filed Aug. 7, 1945    2 Sheets-Sheet 1
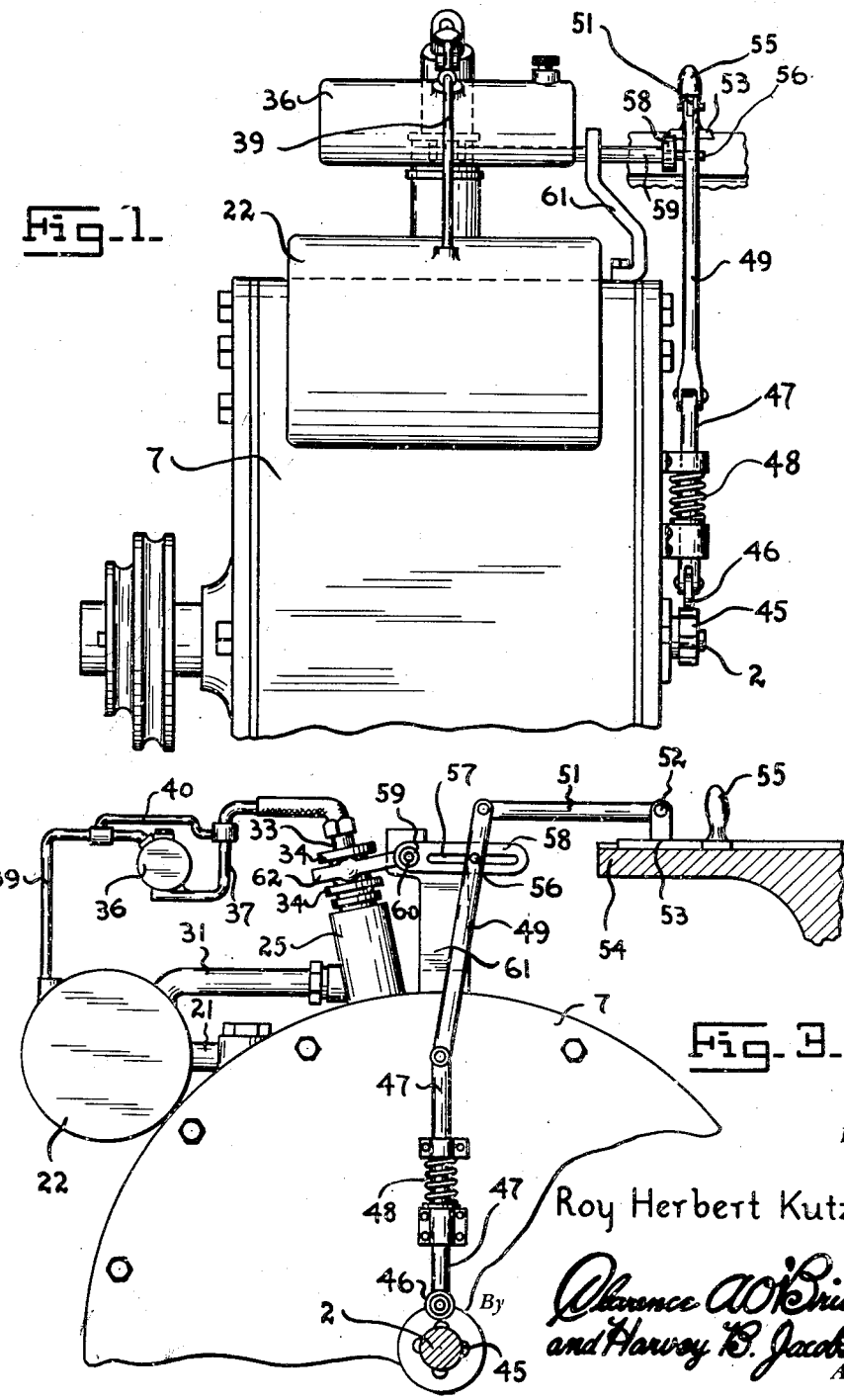
Inventor
Roy Herbert Kutzner

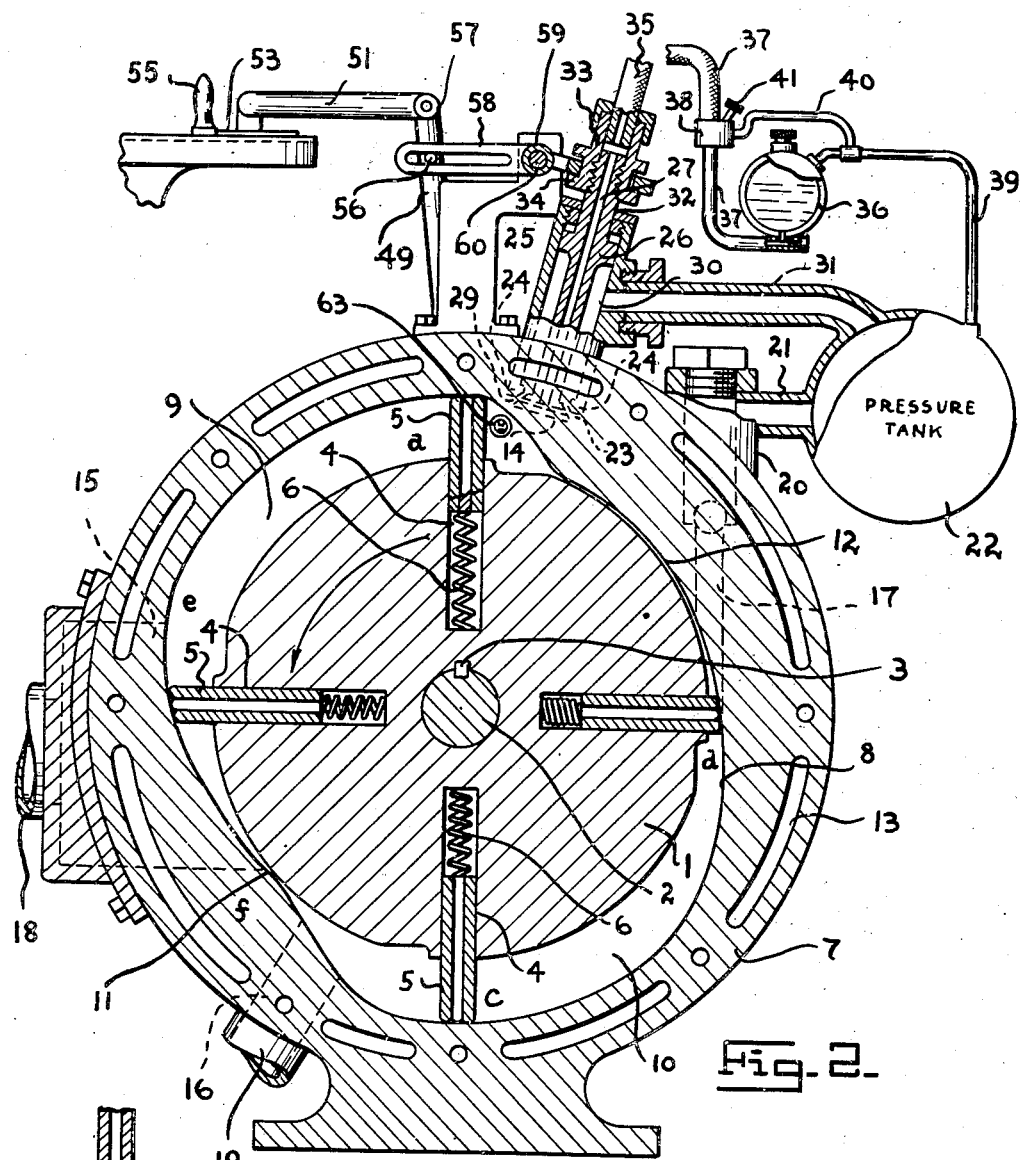

Patented Apr. 26, 1949

2,468,451

UNITED STATES PATENT OFFICE 2,468,451

ROTARY INTERNAL-COMBUSTION ENGINE

Roy Herbert Kutzner, St. Louis, Mo.

Application August 7, 1945, Serial No. 609,345

4 Claims. (Cl. 123—16)

This invention relates to rotary internal combustion engines having a rotor, acting as a fly wheel, provided with a plurality of radially movable vanes or blades which are pressed against a surrounding casing, the interior of which is so shaped that the said blades or vanes perform a plurality of complete strokes during one revolution of the rotor. Internal combustion engines of this type have the advantage of a more uniform distribution of the power driving the main shaft and of the disappearance of the dead centers, with which the losses due to inertia disappear. To utilize more fully the advantages above mentioned a construction is provided according to the invention which may be used in connection with heavy or light fuels and with high or low compression, the compression being adjusted in accordance with the fuel. In the rotary type of engine the adjustment of the pre-ignition does not entail a counteraction and its adjustment is therefore not a restricted one with a given engine as is the case with engines of the reciprocating type.

The invention, in particular, relates to that type of rotary engine which is provided with a pressure tank for storing air under pressure. The invention essentially consists in a fuel and air admission arrangement comprising a dual valve, by means of which a separate and independent admission of fuel and air into the cylinder space, in which combustion is initiated, takes place. The separate and independent admission of fuel and compressed air is controlled by the said single dual valve, the stroke of which may be adjusted and regulated. This regulation permits to adjust the quantity of fuel and compressed air introduced into the cylinder. The fuel according to the invention is preferably fed from an auxiliary tank which is provided with air under pressure from the compression tank. This method permits to adjust the same engine for a wide variety of fuels of different quality.

The invention will be more fully understood when described with reference to a specific illustrative example and to the accompanying drawings.

In the said drawings:

Figure 1 is an elevational side view of an engine.

Figure 2 is a sectional elevational view of the engine and of its most important accessories.

Figure 3 is a partial elevational end view of the engine.

Figure 4 is a sectional view of a detail.

The engine comprises a cylindrical rotor 1 mounted on a power shaft 2 and secured by means of a key 3. This rotor is provided with a number of radial slots 4 each accommodating a blade or vane 5, and a compression spring 6 endeavoring to press the blade or vane 5 outwardly. The rotor is preferably of a suitable weight so as to be capable to act as a fly wheel.

The rotor 1 operates within a cylindrical casing 7, provided with a bore 8 for accommodating the rotor. Said bore, in the example illustrated in which 4 blades or vanes are shown, is divided into two compartments 9, 10 formed between inwardly protruding portions 11, 12 of the casing, closely surrounding the cylindrical rotor, and by receding portions arranged at a suitable distance from the cylindrical rotor. These protruding and receding portions of the rotor form a continuous surface with transitional portions between them which are curved so as to merge without any abrupt change of direction as seen in the cross section, Figure 2, and so as to offer the required cross section in the various phases of the cycle.

The outer part of the cylindrical casing may be provided with a water jacket 13 formed by suitable cavities.

Four channels 14, 15, 16, 17 are provided, forming outwardly directed ducts connecting the compartments 9, 10, respectively, with outer receptacles. They are all arranged near those transitional portions of the bore by means of which the inwardly protruding portions join with the receding portions forming the two compartments 9, 10. The channel 14 in the upper half constitutes the air and fuel admission channel, which is more fully described below. The channel 15 forms the exhaust pipe 18. The channel 16 in the lower half of the casing is connected with an air intake or suction pipe 19 and the tangentially arranged channel 17 leads to the connecting sleeve 20. The latter by means of a cross pipe 21 is connected with the pressure tank 22, which contains the compressed air.

The admission channel 14 contains the dual admission valve 23 which cooperates with a seat 24 provided at the end of a cylindrical receptacle 25. The valve 23 is provided with a stem 26 having a central bore or duct 27, leading to the valve body, and within said valve body radial bores 29 are arranged leading to the seated portion of the valve. These bores or ducts 29 are, therefore, freed when the valve 23 is moved from its seat 24.

The valve is thus adapted to establish a dual communication. One of these communications leads from the interior of the receptacle 25 to the channel 14 while the other connects said channel with duct or bore 27 by means of the radial bores 29.

The cylindrical receptacle 25 has a lateral inlet opening 30, with which a pipe 31 leading from the compression tank 22 is connected. The interior of the cylindrical receptacle 25 is thus permanently under the pressure of the compressed air of the tank 22 which will rush into the channel 14 as soon as the valve 23 is moved.

The upper part of the cylindrical receptacle 25 is closed but is provided with a passage 32 guiding the stem 26 of the valve and providing a seal against escape of the compressed air, the means for establishing the seal being not shown in the drawing as they do not differ from those regularly employed for similar purposes.

The stem 26 carries a guiding and sealing sleeve 33 provided with collars 34 or with other suitable means permiting to move it up and downwardly and said sleeve 33 establishes connection with the fuel pipe 35 along which it may slide. The fuel pipe 35 in its turn is connected with the fuel tank 36 by means of a standpipe 37 into which a starting valve 38 may be inserted. A pipe 39 leads from pressure tank 22 to the upper part of fuel tank 36, to provide the tank 36 with air under pressure, and a branch pipe 40 permits to establish a direct connection with the pipe 37 by means of the starting valve 38.

The latter simply consists in a screw or other member 41 which may close the branch connection 40 under normal operating conditions; it permits however, to open said connection during the starting period. Thereby the pressure above the tank 36, and in the standpipe 37 are approximately equalized or show a predetermined small difference thus avoiding the flooding of the engine with fuel when compression starts to build up while no counter pressure exists as yet in channel 14 and in the compartment 9 connected with it.

To operate the valve 23 a cam 45 is provided on the power shaft, as seen in Figures 1 and 3. Said cam acts on a roller 46, associated with a push rod 47 which is under the pressure of a spring 48. The push rod 47 is connected with a driving or valve actuating rod 49 which is connected by means of a link 51 with an adjustable pivot carrying member 52 mounted on a slide 53. The position of the slide is adjustable along a guide 54. A handle 55 on the slide 53 serves to effect adjustments. Means (not shown) may be provided to fix the position of the slide in the event that fixation by friction is insufficient.

The drive rod 49 is provided with a drive pin 56 projecting therefrom and entering into the slot 57 of a guide arm 58 fixedly mounted on the valve actuating sleeve 59. This lever is pivoted on a shaft 60 journaled in a standard 61 attached to the casing 7. The rocking sleeve 59 is provided with a forked portion 62 which embraces the sleeve 33 between the collars 34. The forked portion 62, when moved, is thus capable of reciprocating the sleeve 33, the stem 26 and the valve 23.

A spark plug 63 is inserted as usual near the channel 14 supplying air and fuel.

The operation of the engine will be easily understood from the foregoing description.

It is assumed that the rotor will rotate counterclockwise in the direction of the arrow.

When one of the blades 5 reaches the position $a$ the valve 23 has opened and fuel and compressed air is admitted into the space behind the blade in this position. The mixture of fuel and air is ignited by the spark plug 63 and the blade is driven towards the position $e$ by the combustion gases which undergo expansion during such movement. When the blade has reached position $e$ and the gases have expanded to the desired extent the exhaust port 15 is overrun and the gases begin to escape. In position $e$ the blade has uncovered about one half of the exhaust port and is on its way towards position $f$. During the movement from $e$ to $f$ the blade is pushed inwardly against the pressure of the spring by the inwardly projecting portion 11 of the casing. When position $f$ is reached the blade has been pushed back entirely into the slot 4 of the rotor.

When the blade enters the compartment 10 and starts to project again from the rotor it overruns the air intake port 16 and during its further advance to position $c$ and from there to position $d$ its rear side creates a suction in the space behind it which will cause the atmospheric air to rush in through pipe 19 and port 16. The front side of the blade at the same time compresses the air in the compartment 10 which has been sucked in during the passage of the preceding blade. As soon as this preceding blade overruns port 17 the blade travelling from position $c$ towards position $d$ will compress the air in the narrowing portion of the compartment 10 and will press it through channel 17 into the connecting sleeve 20 pipe 21 and pressure tank 22.

It will be manifest that a full cycle of operations has thus been performed in front of a blade during one revolution of the rotor. As the rotor is provided with a plurality of blades, according to size and to the purpose to be achieved, the rotor during one revolution is under the influence of a plurality of cycles working simultaneously and distributed uniformly. In the example shown, therefore, the rotor is permanently driven by the expansion of the gases behind one of the blades and the air is permanently compressed in front of another blade. The delivery of power on the shaft is thus freed to a great extent from fluctuation and likewise fluctuation of pressure in the pressure tank is reduced to insignificant pressure variations.

The pressure within tank 22 acts on the surface of the fuel in tank 36 and the air and the fuel will therefore penetrate under pressure into the space behind the blade advancing towards position $a$ when the valve 23 is opened. In the proper moment cam 45 lifts roller 46, push rod 47 and actuating rod 49, which in its turn moves valve actuating sleeve 59 by means of pin 56 engaging slot 57. Sleeve 59 is thus rocked around its fulcrum 60 and when the slotted guide 58 is lifted fork 62 is depressed and vice versa. Thereby sleeve 33 and stem 26 are alternately depressed and raised and the valve 23 is opened and closed.

From the above description it will be understood that lifting of the valve occurs only while one of the protuberances of the cam 45 passes under the roller 46 and that the stroke of the valve depends on the position of pin 56 within slot 57. As this position may be adjusted by means of slide 53 carrying handle 55 and by means of link 51 the stroke of the valve may be adjusted, and the volume of compressed air and fuel may be regulated.

The invention has been described by way of example in more or less specific terms, but this specific description is to be understood to give to the expert a general suggestion for construction of embodiments of the invention other than those shown and those embodiments, as outlined in the claims, do not constitute a departure from or a change of the essence of the invention.

I claim:

1. A fuel and air supply system for rotary internal combustion engines of the type having a rotor with a plurality of movable and retractable blades, and a substantially cylindrical stator subdivided by said rotor blades into chambers in which the phases of the internal combustion process takes place during rotation of the rotor, each phase taking place within a sector of said stator, said system comprising a dual valve, provided with means for the simultaneous separate independent delivery of fuel and air, arranged in the sector of the stator in which combustion takes place, means for operating said valve during the passage of each rotor blade through said sector, a cylindrical casing forming a receptacle for compressed air above said valve and provided with an air delivery opening controlled by said valve, a permanently open connection of said valve receptacle with the sector of the stator in which compression takes place, a compression tank in said connection, a fuel tank, a permanently open connection of the same with the fuel delivering means of the valve, and a permanently open connection of the pressure tank with the fuel tank.

2. A fuel and air supply system for rotary internal combustion engines of the type having a rotor with a plurality of movable and retractable blades and a substantially cylindrical stator on which the said blades are sliding, said stator being subdivided by said blades into chambers, in which the phases of the combustion process takes place during rotation of the rotor within a sector of said stator, said system comprising a fuel and air channel, opening into the stator sector in which combustion takes place, a dual valve for the simultaneous separate and independent delivery of fuel and air into said channel, a cylindrical receptacle for compresed air provided with a valve seat controlled by the seat portion of the dual valve, a fuel channel within said dual valve having its discharge end in the seat portion of the valve, means for reciprocating said dual valve within said receptacle at each passage of a rotor blade through the above mentioned stator sector, a compression tank, a permanent connection of the stator sector in which compression takes place with the air receptacle including said compression tank, a fuel tank, a permanently open connection of the same with the fuel delivering means of the valve, and a permanently open connection of the pressure tank with the fuel tank.

3. A fuel and air supply system for rotary internal combustion engines as is claimed in claim 2, in which the dual valve comprises a stem and valve disk, said stem being provided with a central channel leading to the central portion of said disk and the disk being provided with radial channels leading to the portion of the valve seated in the valve seat of the receptacle.

4. In a fuel and air supply system for rotary combustion engines as claimed in claim 2, in which the dual valve is provided with a valve stem, and in which the means for reciprocating the valve comprises means for guiding said stem within the cylindrical receptacle, a collared sleeve, carried by said valve stem, a pivoted rockable link engaging said collared sleeve and adjustable means driven by the rotor for reciprocating said link.

ROY HERBERT KUTZNER.

REFERENCES CITED

The following references are of record in the file of this patent:

UNITED STATES PATENTS

| Number | Name | Date |
|---|---|---|
| 728,543 | Chandler | May 19, 1903 |
| 746,870 | McCahon | Dec. 15, 1903 |
| 991,029 | Scott | May 2, 1911 |
| 1,015,411 | Webb | Jan. 23, 1912 |
| 1,119,189 | Moraski | Dec. 1, 1914 |
| 1,142,440 | Krämer | June 8, 1915 |
| 1,251,132 | Taylor | Dec. 25, 1917 |
| 1,302,504 | Briggs | May 6, 1919 |
| 1,303,745 | Vogan | May 13, 1919 |
| 1,563,315 | Alt | Dec. 1, 1925 |
| 1,803,515 | Treiber | May 5, 1931 |
| 1,928,775 | Woolson | Oct. 3, 1933 |

FOREIGN PATENTS

| Number | Country | Date |
|---|---|---|
| 131,176 | Great Britain | Aug. 21, 1919 |